United States Patent
Ganesh

(10) Patent No.: US 6,618,432 B1
(45) Date of Patent: *Sep. 9, 2003

(54) SYSTEMS AND METHODS FOR MINIMIZING INTERFERENCE AND OPTIMIZING PN PLANNING IN CDMA NETWORKS

(75) Inventor: Rajamani Ganesh, Bedford, MA (US)

(73) Assignee: Verizon Laboratories Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/464,273

(22) Filed: Dec. 15, 1999

Related U.S. Application Data

(63) Continuation-in-part of application No. 08/988,736, filed on Dec. 11, 1997, now Pat. No. 6,058,136.

(51) Int. Cl.[7] .............................. H04B 1/69; H04B 7/216
(52) U.S. Cl. ...................... 375/147; 375/148; 375/149; 375/150; 370/335; 370/342
(58) Field of Search ................................. 375/147, 148, 375/149, 150, 130, 206; 370/335, 342

(56) References Cited

U.S. PATENT DOCUMENTS

| | | | | |
|---|---|---|---|---|
| 5,642,377 A | | 6/1997 | Chung et al. ............... | 375/200 |
| 5,644,591 A | | 7/1997 | Sutton ........................ | 375/200 |
| 5,883,889 A | * | 3/1999 | Faruque ..................... | 370/335 |
| 6,049,564 A | * | 4/2000 | Chang ....................... | 375/206 |
| 6,058,136 A | * | 5/2000 | Ganesh et al. ............... | 375/200 |
| 6,122,266 A | * | 9/2000 | Lynch ........................ | 370/335 |
| 6,272,122 B1 | * | 8/2001 | Wee .......................... | 370/342 |
| 6,310,871 B1 | * | 10/2001 | Kim .......................... | 370/342 |
| 6,317,453 B1 | * | 11/2001 | Chang ....................... | 375/140 |
| 6,490,313 B1 | * | 12/2002 | Ganesh et al. ............... | 375/130 |

FOREIGN PATENT DOCUMENTS

| | | | |
|---|---|---|---|
| JP | 10-341479 | 12/1998 | ............ H04Q/7/36 |
| WO | WO 98/49844 | 11/1998 | ............ H04Q/7/00 |

OTHER PUBLICATIONS

J. Plehn, *Applied Frequency Assignment*, 1994 44th Vehicular Technology Conf., pp. 853–857.

Sivarajan, K.N.; McEliece, R.J.; and Ketchum, J.E., *Channel Assignment in Cellular Radio*, 39 IEEE Vehicular Technology Conf. May 1989, pp. 846–850.

IS–97, *Recommended Minimum Performance Standards for Base Stations Supporting Dual–Mode Wideband Spread Spectrum Cellular Mobile Stations*, EIA Interim Standard Feb. 26, 1996, whole document.

IS–98, *Recommended Minimum Performance Standards for Dual–Mode Wideband Spread Spectrum Cellular Mobile Stations*, EIA Interim Standard, Apr. 17, 1996, whole document.

Principles of CDMA, http://www.cdg.org/a_ross/Principles.html, p. 1.

Spreading Codes, http://www.cdg.org/a_ross/Spreading.html, p. 1.

(List continued on next page.)

Primary Examiner—Stephen Chin
Assistant Examiner—Sam K Ahn
(74) Attorney, Agent, or Firm—James K. Weixel

(57) ABSTRACT

A system assigns PN offsets in a network (100) with multiple sectors (110). The system sets parameters for the network (100) and assigns PN offsets to the sectors (110) based on the set parameters. The system then identifies sectors (110) in the network (100) that have poor network performance as a result of the PN offset assignments. The system changes parameters for the identified sectors (110) and reassigns PN offsets to the sectors (110) based on the changed parameters to improve network performance.

39 Claims, 8 Drawing Sheets

OTHER PUBLICATIONS

Reverse CDMA Channel, http://www.cdg.org/a_ross/Reverse.html, p. 1–4.

Forward CDMA Channel, http://www.cdg.org/a_ross/Forward.html, p. 1–5.

Introduction to CDMA, http://www.cdg.org/a_ross/Intro.html, p. 1–2.

IS–95 CDMA System Issues, http://www.ericson.se/systems/D-AMPS_1900/19_35_36.html, p. 1–3.

About Granet, http://info.gte.com/granet/granet_intro.html, p. 1.

Mobile Station–Base Station compatibility Standard for Dual–Mode Wideband Spread Spectrum Cellular System TIA/EIA Interim Standard, TIA/EIA/IS–95–A, p. 6–1 through 6–285.

* cited by examiner

SYSTEMS AND METHODS FOR MINIMIZING INTERFERENCE AND OPTIMIZING PN PLANNING IN CDMA NETWORKS

RELATED APPLICATION

This application is a continuation-in-part of U.S. application, Ser. No. 08/988,736, filed Dec. 11, 1997, now U.S. Pat. No. 6,058,136, which is incorporated herein by reference in its entirety.

FIELD OF THE INVENTION

The present invention relates generally to wireless communications systems and, more particularly, to systems and methods that optimally assign pseudo-noise (PN) offsets to base stations in a Code Division Multiple Access (CDMA) cellular network to maximize co-offset and adjacent offset protection and to minimize interference in the network.

BACKGROUND OF THE INVENTION

A CDMA cellular network is a digital spread spectrum communications system. The CDMA network includes several base stations that provide digital service to wireless units located in different geographical regions. Communication between a wireless unit and a base station in a CDMA network, based on the IS-95A standard, occurs on reverse and forward CDMA channels. The reverse CDMA channel carries traffic and signaling information from a wireless unit to a base station. The forward CDMA channel carries pilot, sync, and paging signals, in addition to traffic signals, from a base station to a wireless unit.

The reverse CDMA channel includes access channels and reverse traffic channels. The wireless unit uses the access channels to initiate communication with a base station and to respond to paging channel requests.

The forward CDMA channel consists of a pilot channel, a sync channel, up to seven paging channels, and up to sixty-three forward traffic channels. Each of these channels is orthogonally spread by an appropriate Walsh function and then spread by the quadrature pair of PN sequences (I and Q) at a fixed rate of 1.2288 million chips per second.

The base station of a sector continuously transmits on the pilot channel of each active forward CDMA channel. A wireless unit operating within the coverage area of the base station uses this continuous transmission for synchronization. The network assigns each base station of the cell site a specific time (or phase) offset of the pilot PN sequence to identify a forward CDMA channel. A given base station uses the same pilot PN sequence offset, or simply PN offset, for all CDMA frequency assignments. For example, all traffic, sync, and paging channels transmitted from a single base station share the same PN offset. An offset index (0 through 511 inclusive) identifies distinct pilot channels. This offset index specifies the offset value from the zero offset pilot PN sequence. Each offset index increment represents the interval between pilot channels in increments of 64 chips (i.e., 52.08 ms).

An active wireless unit maintains four sets of pilot channels when communicating with a base station of a CDMA sector: the Active Set, the Candidate Set, the Neighbor Set, and the Remaining Set. The Active Set contains all of the pilot channels that the wireless unit currently uses for demodulation. The Candidate Set contains all of the pilot channels that are not currently in the Active Set but have sufficient signal strength to be considered for soft or softer handoff. The Neighbor Set contains pilot channels that are not currently in the Active or Candidate Set, but may become eligible for handoff (e.g., pilot channels of nearby sites). The Remaining Set is the set of all possible assigned pilot channels in the CDMA network on the same carrier frequency, excluding the pilot channels defined in the other three sets.

Because all PN offsets in a network are time shifted versions of each other, it follows that with appropriate time delay, an incorrect pilot channel from any sector may be mistaken for a pilot channel in the Active Set. A large time delay between a wireless unit and a base station implies a large path loss, however, and hence a weak pilot channel signal at the wireless unit. Thus, if the PN offsets of different sectors have a large separation between them, a pilot channel signal would have a very high path loss and hence a very small probability of appearing within an active search window of another pilot channel. This makes an appropriate assignment of PN offsets crucial to ensure that a wrong pilot channel would be sufficiently weak to not cause any problems.

Reusing PN offsets is possible if: (1) a wireless unit being served by a base station is not interfered with by the pilot channel of another CDMA base station using the same PN offset, or (2) a base station in the network can uniquely identify all the pilot channel signals being reported by a wireless unit that it is serving.

The wireless unit uses a network-selected PILOT_INC parameter for the base station to determine which pilot channels to scan from among the Remaining Set. The Remaining Set includes the set of all possible pilot channels in the system that are integer multiples of the PILOT_INC parameter on the current CDMA frequency assignment, excluding pilot channels in the other sets. A Remaining Set pilot channel is assigned a lower priority in the scanning order, than an Active, Candidate or a Neighbor Set pilot channel.

The setting of the PILOT_INC parameter by the network is crucial to PN offset index planning. It impacts the wireless unit's Remaining Set pilot channel scanning rate, the amount of co-offset and adjacent offset protection available in the network, and the total number of offsets available. Co-offset protection relates to interference caused by two or more sectors using the same PN offset. Adjacent offset protection relates to interference caused by two or more sectors using adjacent PN offsets.

The PILOT_INC parameter refers to the separation in phase or distance in phase-space between two adjacent PN offsets. It is an integer with a valid range from 1 to 15. Low values of PILOT_INC provide good co-offset protection, more offsets from which to choose, and less reuse of offsets, and increase the time to scan the pilot channels in the Remaining Set of the wireless unit. High values of PILOT_INC, on the other hand, provide good adjacent-offset protection, fewer offsets from which to choose, and more reuse of offsets, and decrease the time to scan the pilot channels in the Remaining Set of the wireless unit.

Conventional PN offset planning methods are based on idealized hexagonal grid structures, and accomplished by fitting a highly irregular pattern of cellular base station locations to a tessellated hexagonal grid pattern. PN offsets are assigned by reusing the same PN offset a specified predetermined number of base stations away.

In order to plan for growth, the conventional methods usually group PN offsets into a few groups, typically three for tri-sectored sites in the network. One sector of a base station is assigned a PN offset from one of the three groups. The other two sectors of the base station are assigned PN offsets from the other two groups, respectively. A few PN offsets in each group are reserved for growth of the network when new base stations are added. The remaining PN offsets in each group are used to make assignments. Making assignments by groups, however, is not optimal in terms of reducing inter-sector interference. Moreover, the unused PN offsets constitute a wasted resource until the network grows.

The conventional methods make initial assignment choices very easy because the assignments can be made without computer assistance or optimized planning. After an initial assignment, the methods account for irregularities through manual modification of the assignment by an experienced engineer with local knowledge of the environment. Unfortunately, PN offset planning under these idealized assumptions creates many inefficiencies due to the initial assignment's inaccurate reflection of reality.

The irregularities that produce these inefficiencies are due to several factors. First, the need for base stations in a particular area is highly non-uniform because people do not tend to distribute themselves uniformly over large areas. People tend, for example, to cluster in neighborhoods, at work, and in cities. Second, choices for new base station locations are very limited due to factors such as zoning. Base station locations cannot be chosen in ideal locations even if the user traffic was uniformly distributed over a geographic area. Lastly, areas that are covered by base stations are highly dependent upon the propagation environment. Irregularities such as terrain, morphology, and reflecting structures produce highly irregular areas of coverage.

Automatic PN offset planning has heretofore found only limited application due to the need to account for several sets of constraints in a timely manner. Optimization systems must be able to handle large cellular networks with constraints on both co-offset and adjacent offset assignments. For example, the same PN offset cannot be used by neighbors of a base station or neighbors of neighbors of a base station. Adjacent offset protection must be provided to ensure that an adjacent offset does not propagate into a coverage area with significant power to interfere with the pilot channel. Both allowable PN offset separation and interference limits are constraints needed to address this problem adequately.

Many conventional systems address optimization problems using only minimum allowable PN offset separation constraints. These systems tend to be overly constraining since a range of PN offset prohibitions is needed between base station sectors rather than simply prohibiting use of every offset below a certain threshold interference. These systems also ignore factors such as interference from more than two assignments of the same offset.

By constraining the problem with minimum allowed offset separation between sectors, these systems tend to over constrain the PN offset assignment problem. For PN offset planning, two sectors interfere if the pilot channels arriving at the wireless unit are in phase with each other within the search window of the wireless unit. The systems look at all possible wireless unit locations to find a range of invalid PN offset separations that they use to constrain the problem. The constraint on PN offset separation, however, results in a range of allowable PN offsets rather than a minimum allowed PN offset separation.

Other conventional systems handle interference as well as separation constraints. These systems are designed, however, for the different problem of making analog frequency assignments. Such problems tend to be large and arise from the need to plan for many assignments per analog frequency. These systems must use less complex methods than those that can be used for PN offset planning.

None of the conventional systems or methods provides optimum PN offset assignment because none of these systems or methods considers all possible interference mechanisms in the network, constraints on co-offset and adjacent offset protection, CDMA border and beacon sites, and preassigned PN offsets. In addition, none of the conventional systems determine interference-prone and problematic areas within the serving area of a CDMA network. These problematic areas affect optimal PN planning in the network because these areas may lead to: synchronization of a wireless unit with the wrong pilot channel, pilot pollution, deterioration in voice and data signal quality and, thus, quality of service (QoS), and poor network performance.

Therefore, a need exists to provide information regarding interference-prone and problematic areas in the network so that overall network performance can be improved and optimum PN offset assignments can be made.

SUMMARY OF THE INVENTION

Systems and methods consistent with the present invention address this need by locating and addressing interference-prone and problematic areas in the network to facilitate optimum PN offset assignment. The systems and methods also enable scalability for future growth without the need for a revised network-wide retuning.

In accordance with the purpose of the invention as embodied and broadly described herein, a system, in one implementation consistent with the present invention, assigns PN offsets in a network with multiple sectors. The system sets parameters for the network and assigns PN offsets to the sectors based on the set parameters. The system then identifies sectors in the network that have poor network performance as a result of the PN offset assignments. The system changes parameters for the identified sectors and reassigns PN offsets to the sectors based on the changed parameters to improve network performance.

In another implementation consistent with the present invention, a method assigns PN offsets in a network with multiple sectors. The method includes determining potential interference between each pair of the sectors in the network; identifying constraints for each of the sectors based on the determined potential interference; assigning PN offsets to the sectors based on the identified constraints; assessing network performance as a result of the PN offset assignments; receiving a change to the PN offset assignment for at least one of the sectors; and reassessing network performance as a result of the received change.

In yet another implementation consistent with the present invention, a method assigns PN offsets in a network with multiple sectors. The method includes setting parameters for the network; assigning PN offsets to the sectors based on the set parameters; identifying at least a first sector in the network having poor network performance; identifying at least a second sector in the network causing interference to the first sector; changing parameters for at least one of the first and second sectors; and reassigning PN offsets to the sectors based on the changed parameters to improve network performance.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention address interference-prone and problematic areas in a CDMA network to provide optimum PN offset index planning in the network. The PN offset index planning systems and methods are based on the EIA/TIA/IS-95A standard, which is hereby incorporated by reference.

EXEMPLARY NETWORK

Figure 1:
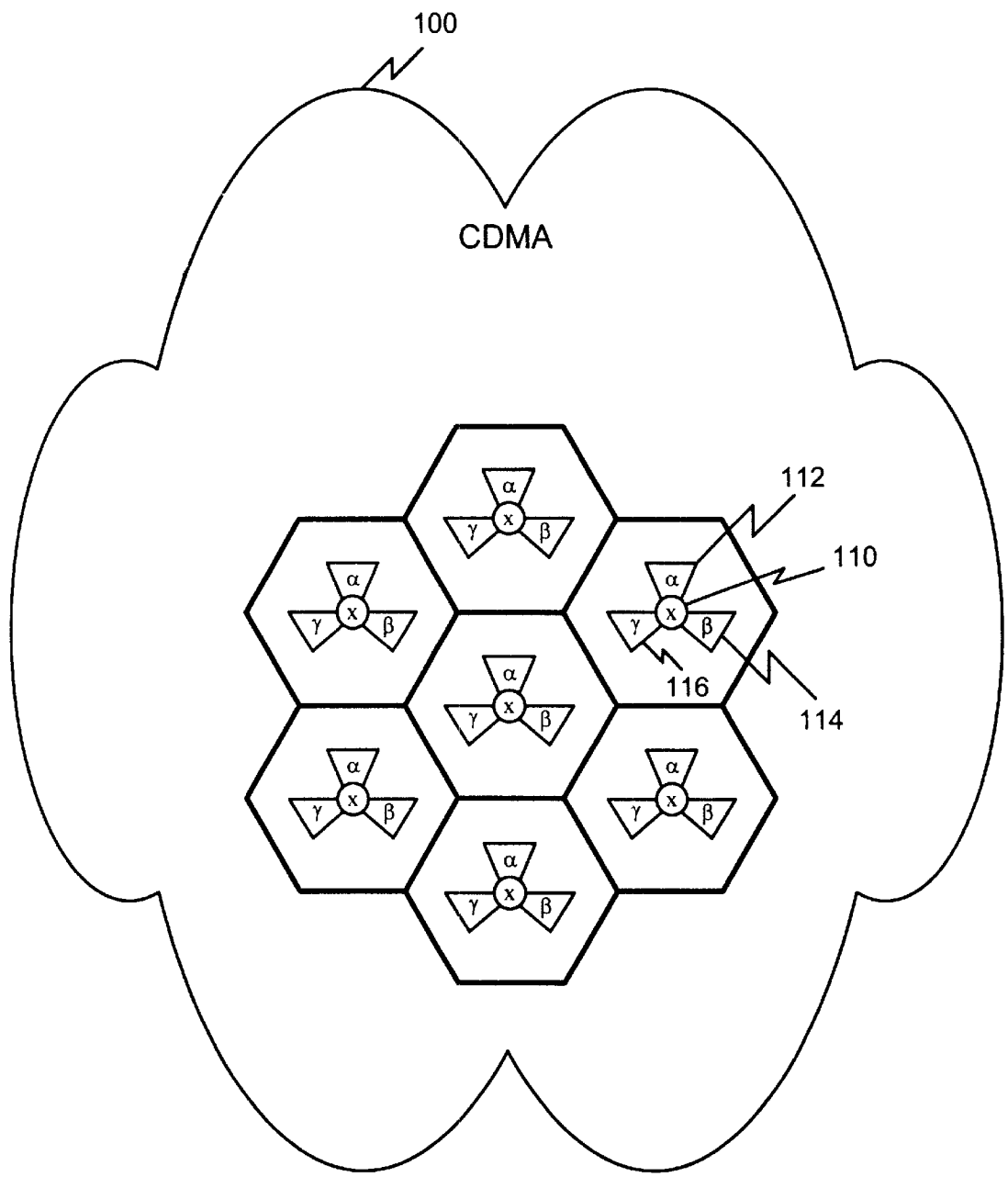
FIG. 1 is an exemplary diagram of a CDMA network in which systems and methods consistent with the present invention may be implemented.

FIG. 1 is a block diagram of a CDMA network 100 in which systems and methods consistent with the present invention may be implemented. The CDMA network 100 includes multiple cell sites, such as cell site 110. The cell sites may be tri-sectored cell sites containing three sectors α, β, and γ. Cell site 110, for example, includes sector α 112, sector β 114, sector γ 116, and a base station module (not shown). The CDMA network 100 assigns each base station a specific time, or phase, offset of the pilot PN sequence to identify a forward CDMA channel. The same pilot PN sequence offset is used on all CDMA frequency assignments for a given sector.

Distinct pilot channels are identified by an offset index (0 through 511 inclusive) that specifies the offset value from the zero offset pilot PN sequence. Since the CDMA network 100 allows wireless units in adjacent cell sites to use the same frequency, inter-sector interference isolation is obtained by limiting the "valid" set of offsets to multiples of the PILOT_INC parameter. The setting of the PILOT_INC parameter (valid values range from 1 to 15) by the network 100 has an impact on the wireless unit's pilot scanning rate, the amount of co-offset and adjacent offset protection available in the network 100, and the total number of offsets available.

Systems and methods consistent with the present invention perform CDMA PN offset index planning. A computer device, such as a personal computer or a larger main frame computer, performs the planning by operating on a simulated CDMA network to provide optimum PN offset index planning for use in an actual CDMA network.

Figure 2:
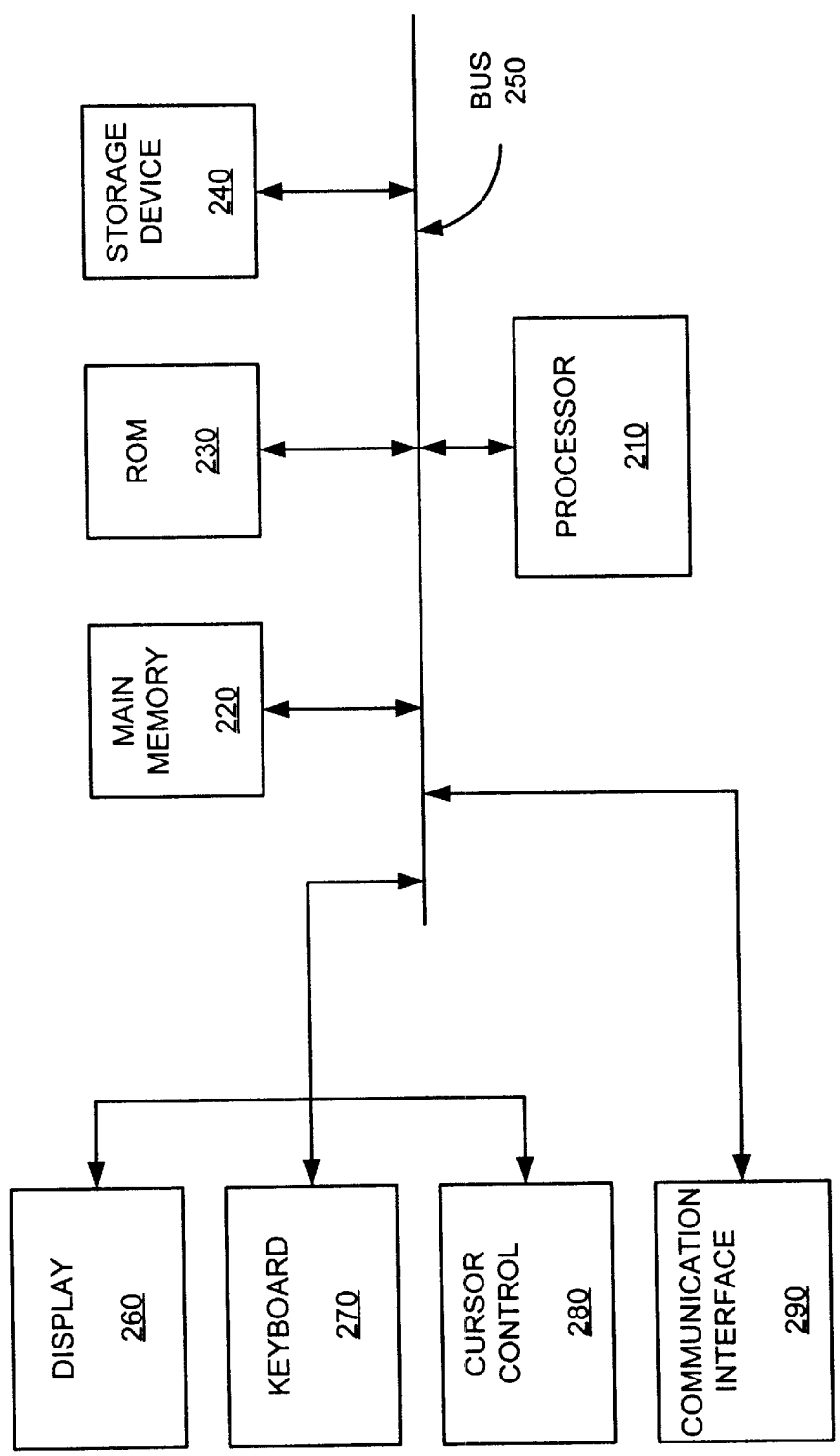
FIG. 2 is an exemplary diagram of a computer device on which systems and methods consistent with the present invention may be implemented.

FIG. 2 is an exemplary diagram of a computer device 200 on which systems and methods consistent with the present invention may be implemented. The computer device 200 includes a processor 210, main memory 220, a read only memory (ROM) 230, storage device 240, bus 250, display 260, keyboard 270, cursor control 280, and communication interface 290.

The processor 210 may include any type of conventional processing device that interprets and executes instructions. Main memory 220 may be a random access memory (RAM) or a similar dynamic storage device. Main memory 220 stores information and instructions for execution by processor 210. Main memory 220 may also be used for storing temporary variables or other intermediate information during execution of instructions by processor 210. ROM 230 stores static information and instructions for the processor 210. It will be appreciated that ROM 230 may be replaced with some other type of static storage device. The data storage device 240 may include any type of magnetic or optical disk and its corresponding disk drive. Data storage device 240 stores information and instructions for use by the processor 210. The bus 250 includes a set of hardware lines (i.e., conductors) that allows for data transfer among the components of the computer device 200.

The display 260 may be a cathode ray tube (CRT), or the like, for displaying information to an operator. The keyboard 270 and cursor control 280 allow the operator to interact with the computer device 200. The cursor control 280 may include, for example, a mouse.

The communication interface 290 enables the computer device 200 to communicate with other devices/systems via any communications medium. For example, the communication interface 290 may be a modem or an Ethernet interface to a LAN. Alternatively, the communication interface can be any other interface that enables communication between the computer device 200 and other devices or systems.

As will be described in detail below, a computer device 200, consistent with the present invention, performs CDMA PN offset index planning. The computer device 200 performs this task in response to the processor 210 executing sequences of instructions contained in, for example, memory 220. The instructions may be read into memory 220 from another computer-readable medium, such as the data storage device 240, or from another device via the communication interface 290.

Execution of the sequences of instructions contained in memory 220 causes the processor 210 to perform processes that will be described later. Alternatively, hardwired circuitry may be used in place of or in combination with software instructions to implement processes consistent with the present invention. Thus, the present invention is not limited to any specific combination of hardware circuitry and software.

EXEMPLARY PROCESSING

FIGS. 3–6 are flowcharts of processing for performing CDMA PN offset index planning in a manner consistent with the present invention. FIGS. 4A and 4B are flowcharts of PN offset assignment processing consistent with the present invention.

Figure 3:
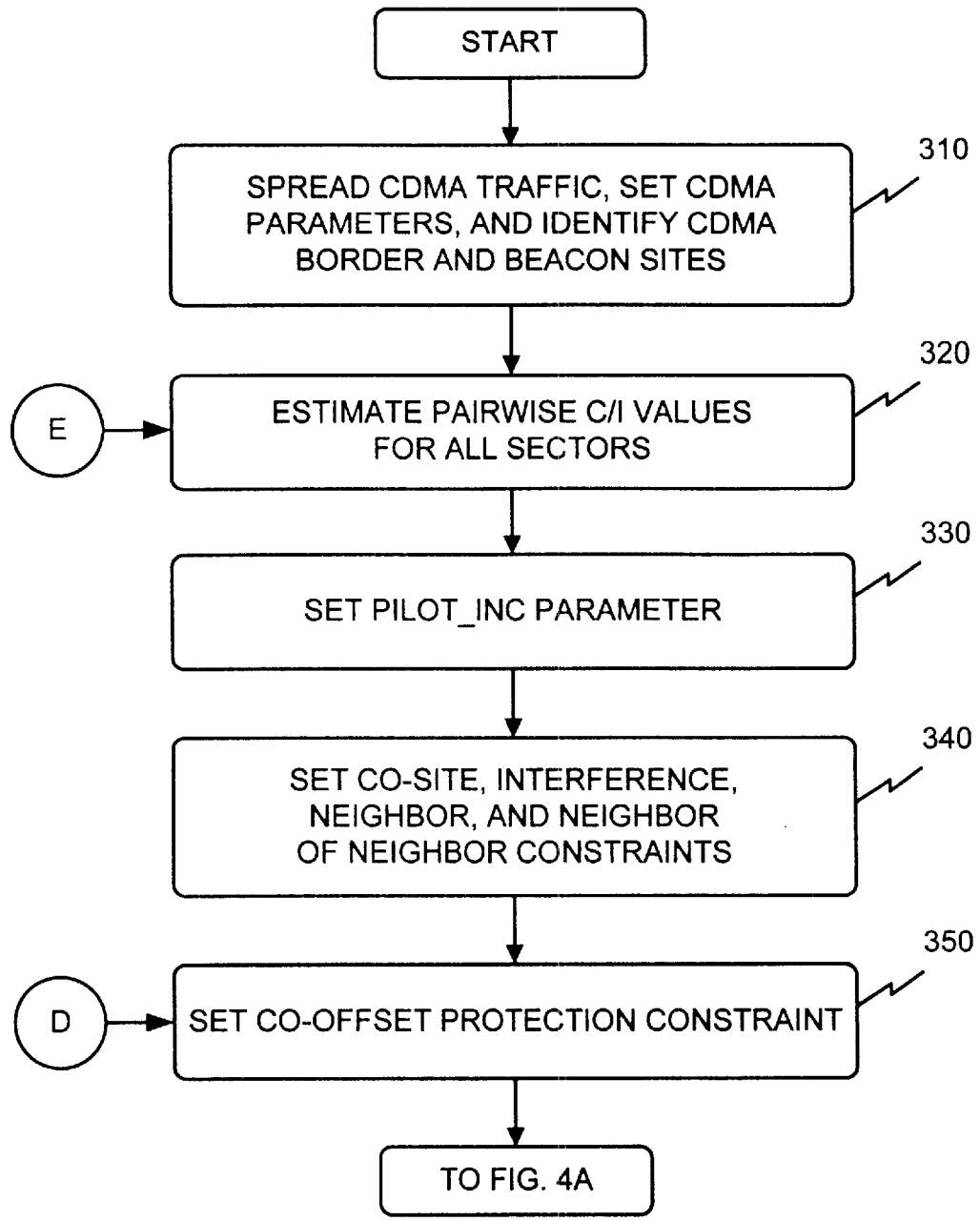
FIGS. 3–6 are flowcharts of processing for performing CDMA PN offset index planning in a manner consistent with the present invention.

In FIG. 3, a system, such as the computer device 200 (FIG. 2), begins processing by spreading CDMA traffic, setting CDMA parameters, and identifying CDMA border and beacon sites in the network [step 310]. Spreading the CDMA traffic entails designating a traffic map for the network to distribute the anticipated CDMA network traffic across the best serving areas of all of the cell sites/sectors. The CDMA parameters include power settings for all of the channels, antenna gain, cable loss, handoff thresholds, etc. The system identifies CDMA border and beacon sites to ensure accurate calculation of interference from the CDMA border and beacon sites located in the CDMA to Advanced Mobile Phone System (AMPS) border areas. The received pilot power threshold for the serving area of these sites is kept higher than that of the regular CDMA sites because of the hard handdown required from CDMA to AMPS before the wireless unit loses synchronization with any forward CDMA channel.

The system selects the border and beacon sites a priori in the network, prior to the system estimating a pilot channel channel interference (C/I) matrix [step 320]. The pilot channel C/I matrix holds the "pairwise C/I" values for every pair of CDMA sectors in the network. The pairwise C/I values represent a measure of the strength of the carrier power relative to the interfering power from one interfering sector caused to 90% of the wireless units served by a carrier sector on the assumption that the two sectors share the same PN offset index. C represents the carrier sector pilot channel power, and I represents interference power from all of the interfering sectors using the same PN offset index.

The system calculates interference power based on parameters, such as pilot channel nominal power, forward cable loss, and antenna gain at each CDMA sector. The system also takes into account several other factors, such as the link direction, coverage areas, and traffic distributions. In addition, the system may consider in the analysis only those wireless units where the received pilot channel power from the carrier sector exceeds a certain threshold pilot power. The threshold pilot power could be different from the serving area of one CDMA sector to another and is dependent on the parameters mentioned above.

Next, an operator may select a PILOT_INC parameter or change the PILOT_INC parameter from its default state [step 330]. In other implementations consistent with the present invention, the system automatically sets the PILOT_INC parameter. The system determines valid offsets based on the PILOT_INC parameter. As previously mentioned, inter-sector interference isolation in the CDMA network is obtained by limiting the "valid" set of offsets to multiples of the PILOT_INC parameter. The system uses these valid offsets in conjunction with the pilot channel C/I matrix values to set up various constraints for each sector [step 340].

The constraints determine the minimum offset index separation required between any pair of CDMA sectors in the network. The system takes into account various constraints between each pair of sectors, and before any PN offset assignment occurs, the system determines a final constraint value between a pair of sectors using, for example, the maximum value of all the constraints. The final constraint value may range from the value of PILOT_INC to four times the value of PILOT_INC. The different constraints determined for each pair of CDMA sectors in the network include: co-site constraints, interference constraints, neighbor constraints, and neighbor of neighbor constraints.

The co-site constraints regulate the offset separation between sectors of the same cell site. The system sets the co-site constraints based on the operator-supplied PILOT_INC parameter and vary from 2 to 4 (i.e., 2 to 4 times the PILOT_INC parameter, where 4 is used for low values of the PILOT_INC parameter). The system may set the interference constraints based on a selected co-offset protection and the estimated pilot channel C/I values. The interference constraints are set to one offset separation (or one PILOT_INC separation), for example, if the C/I values for any pair of CDMA sectors is less than the selected co-offset protection constraint.

The neighbor constraints dictate the offset separation between two neighboring sectors. The system sets the neighbor constraints to a value ranging from 1 to 4 (i.e., 1 to 4 times the PILOT_INC parameter) based on whether the neighboring sectors are bound by co-site or interference constraints. The system also sets the neighbor constraints between all pairs of sectors in two CDMA cell sites, if any sector of one CDMA cell site is a neighbor of any sector of another CDMA cell site. For example, if the $\alpha$ sector of a CDMA cell site (($\alpha_1$) is the neighbor of the $\beta$ sector of another CDMA cell site ($\beta_2$), then the neighbor constraints are set to a value of one not only between $\alpha_1$ and $\beta_2$ but also between $\alpha_1$ and $\alpha_2$ and between $\alpha_1$ and $\gamma_2$, and vice versa (where ($\alpha_1$, $\beta_1$, and $\gamma_1$ are the three sectors of the tri-sectored CDMA cell site 1 and $\alpha_2$, $\beta_2$, and $\gamma_2$ are the three sectors of the tri-sectored CDMA cell site 2).

The neighbor of neighbor constraints regulate the offset separation between sectors $\alpha$ and $\gamma$, given that sectors $\alpha$, $\beta$ and sectors $\beta$, $\gamma$ are neighbors. The system sets the neighbor of neighbor constraints based on the pairwise pilot channel C/I values between sectors $\alpha$ and $\beta$ and between sector $\beta$ and $\gamma$, and all of the other constraints. The system compares an interference threshold, that is lower than the CDMA handoff threshold, to the pairwise pilot channel C/I values to set the neighbor of neighbor constraints equal to one PILOT_INC separation.

Figure 4A:
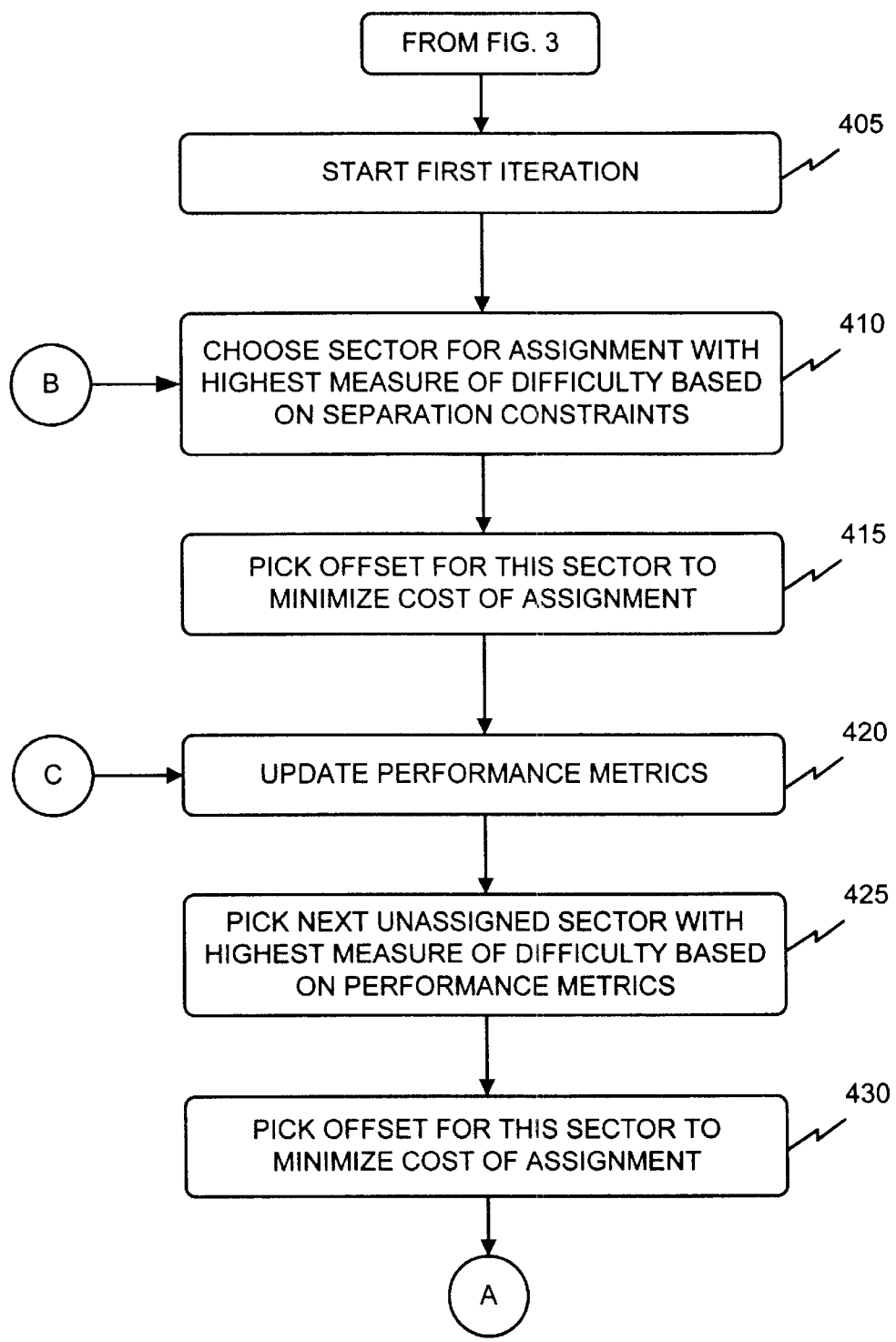
Figure 4B:
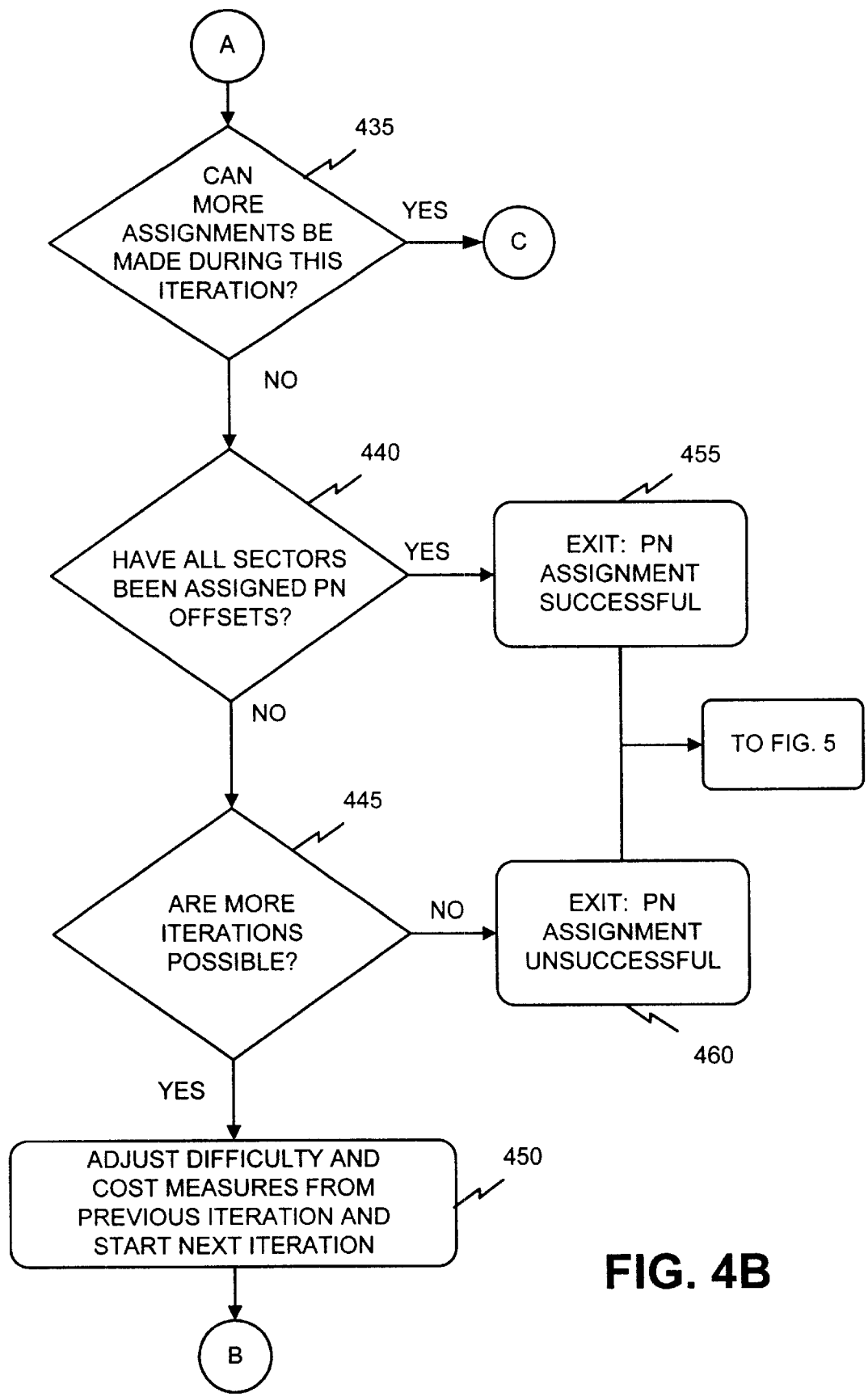

Next, the system sets a starting value for co-offset protection based on the PILOT_INC parameter [step 350]. The system then calls a PN offset assignment module (FIGS. 4A and 4B). The PN offset assignment module attempts to find an assignment of PN offsets from a pool of candidate PN offsets available to the sectors. The pool of candidate PN offsets (0 through 511) is limited to multiples of the PILOT_INC parameter to obtain sufficient inter-sector interference isolation. The module makes an assignment to meet the constraints on both offset separation and pilot channel interference.

The PN offset assignment module begins a first iteration at step 405 (FIG. 4A). The module chooses a sector for assignment with a highest measure of assignment difficulty based on the separation constraints [step 410]. PN offset separation constraints are specified in terms of an allowed offset separation for all pairs of CDMA sectors under consideration. The allowed offset separation for any pair of CDMA sectors is derived from the various constraints described earlier.

The adjacent offset separation constraints are controlled by the PILOT_INC parameter. A large value of PILOT_INC ensures a greater adjacent separation between PN offset assignments at the cost of reducing the available pool of offsets passed to the PN offset assignment module. The effect of reducing the pool is to increase the number of times the same PN offsets from the pool are reused across the network creating potential interference.

This interference is accounted for through the specified co-offset protection constraint. The module uses the pairwise pilot channel C/I values to estimate the $C/I_{sum}$, where C is the "carrier" pilot channel power and $I^{sum}$ is the sum of all interference powers from all sectors which use the same PN offset. The system incrementally computes the value of $C/I_{sum}$ and compares it to the specified co-offset protection threshold before making each PN offset assignment. If a candidate PN offset falls below the threshold, it is not considered as a viable candidate for an assignment. Also if a candidate offset does not meet the offset separation requirements, it is discarded as a candidate for an assignment. From the remaining set of candidate PN offsets, the module chooses an offset to minimize a measure of assignment difficulty across the entire network [step 415].

The module then updates the performance metrics [step 420]. The performance metrics include the measure of assignment difficulty and $C/I_{sum}$ values. The performance metrics are updated after every assignment choice.

Once the performance metrics have been updated, the module chooses a next sector with a highest measure of assignment difficulty based on the performance metrics [step 425]. The module then chooses an offset to minimize the measure of assignment difficulty across the entire network [step 430].

The module then determines whether more assignments can be made during this iteration [step 435] (FIG. 4B). If more assignments can be made, the module updates the performance metrics [step 420] (FIG. 4A), chooses a next unassigned sector [step 425], and selects an offset for the chosen sector [step 430]. If no more assignments can be made, the module determines whether all sectors have been assigned PN offsets [step 440]. If unassigned sectors remain, the module determines whether any iterations remain [step 445]. Each assignment attempt constitutes an iteration and the number of iterations may be selected by an operator or by the system. If more iterations are possible, the module adjusts the difficulty and cost measurements to reflect knowledge acquired during the previous iterations, and starts the next iteration [step 450].

If all of the sectors have been assigned PN offsets, the module declares the PN offset assignment successful [step 455]. The module does not attempt to improve upon the assignment. Whereas, if all of the sectors have not been assigned PN offsets and no more iterations remain, the module declares the PN offset assignment unsuccessful [step 460]. In either instance, processing continues with the flowchart of FIG. 5.

Figure 5:
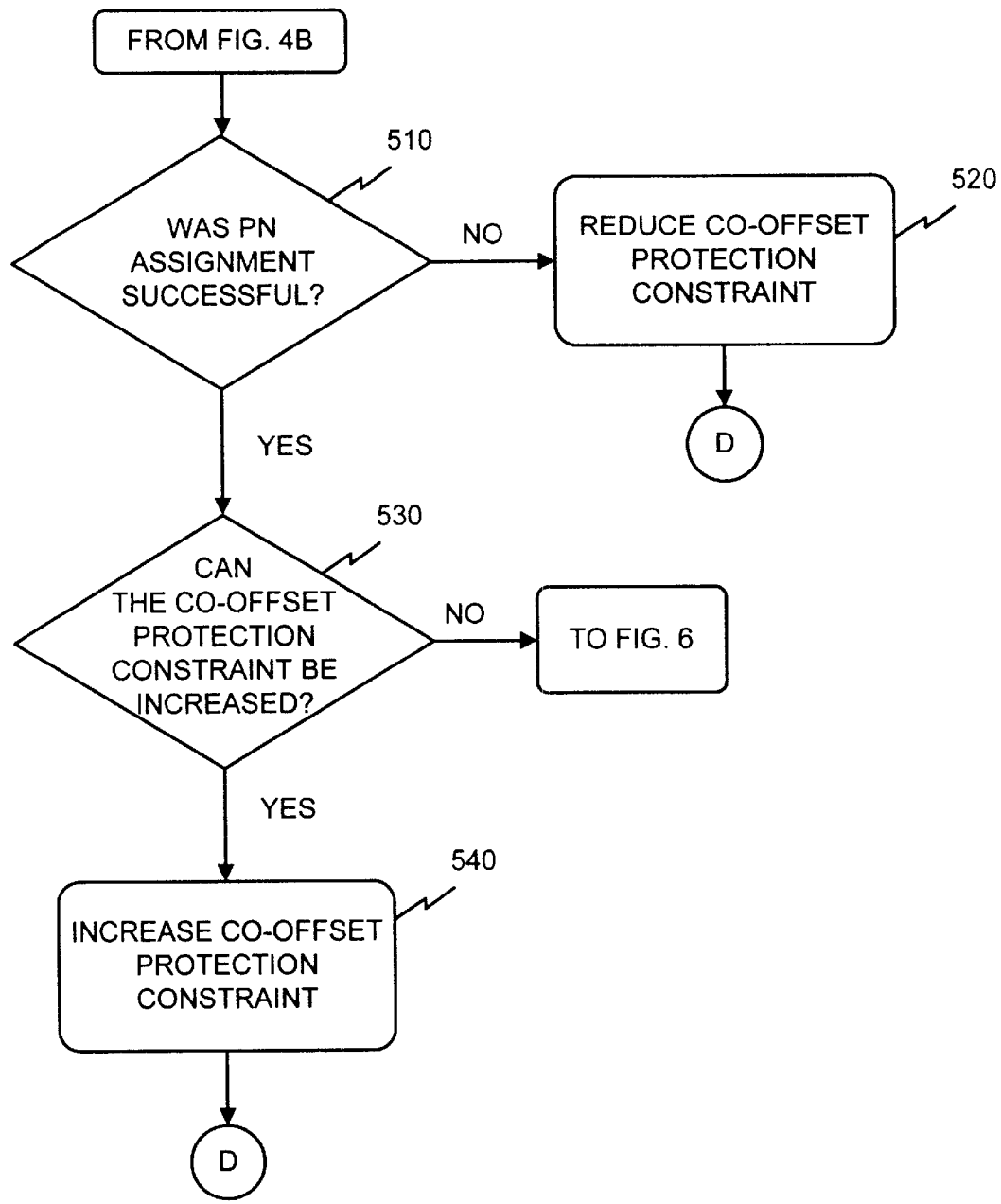

In FIG. 5, the system determines whether the PN offset assignment was successful [step 510]. If the PN offset assignment was unsuccessful, the system reduces the co-offset protection constraint [step 520] and returns to step 350 in FIG. 3, where it uses the co-offset protection constraint to set the interference, co-site, and neighbor constraints.

If the PN offset assignment was successful, however, the system determines whether the co-offset protection constraint can be increased [step 530]. If the co-offset protection constraint can be increased, the system increases it [step 540] and returns to step 350 in FIG. 3, where the system uses the co-offset protection constraint to set the interference, co-site, and neighbor constraints.

Figure 6:
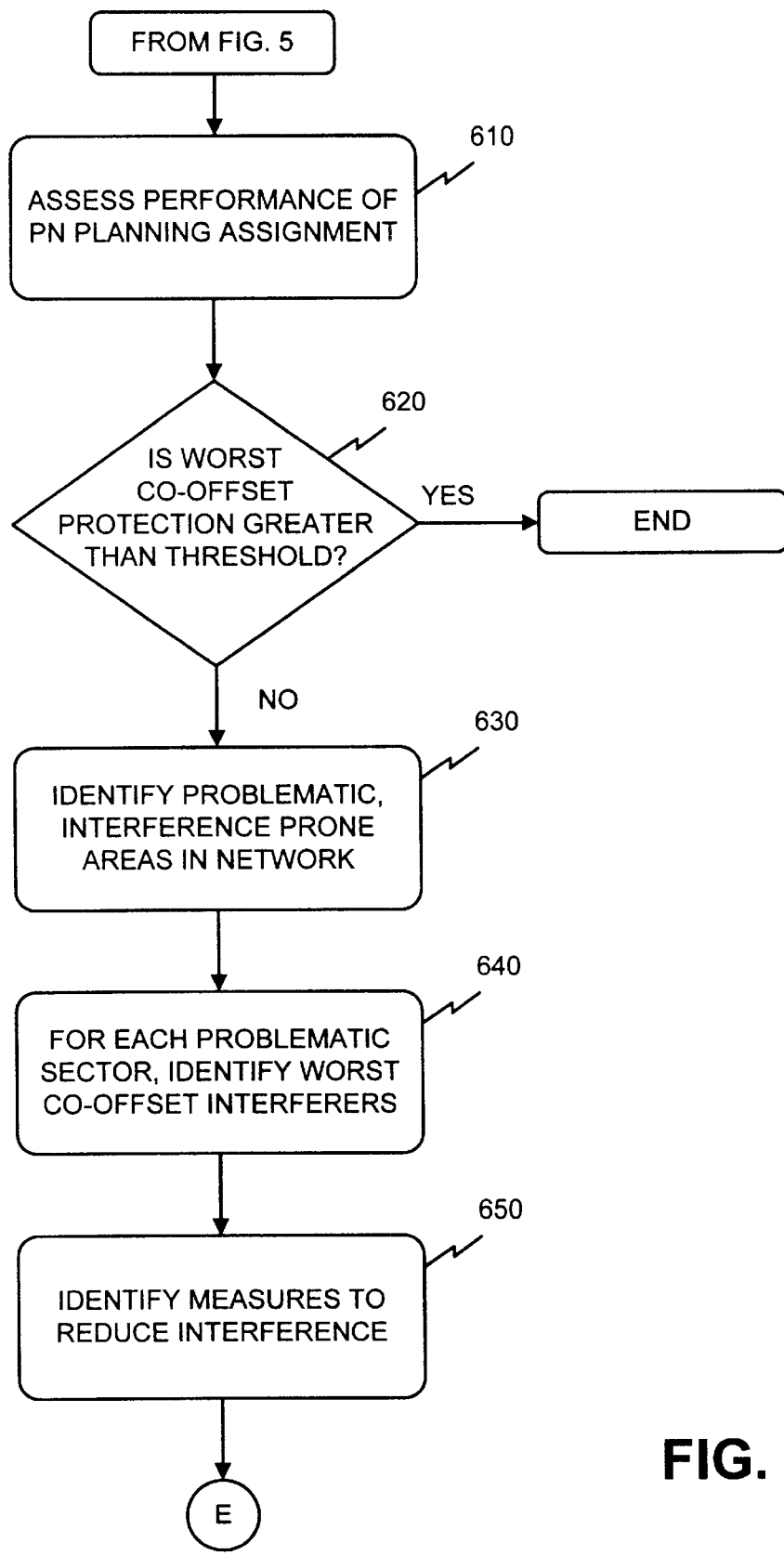

If, on the other hand, the system determines that the co-offset protection constraint cannot be increased, the system proceeds with processing in FIG. 6. In FIG. 6, the system assesses the performance of the PN planning assignment [step 610)]. The system determines whether the worst co-offset protection is greater than a predetermined, possibly operator-defined, threshold [step 620]. If the worst co-offset is greater than the predetermined threshold, processing ends because the system has achieved an optimum PN offset index plan for the network.

If, on the other hand, the worst co-offset protection is not greater than the threshold, the system identifies problematic, interference-prone areas in the network [step 630]. By this point, the system has generated accurate information about wireless unit locations in the network where the C/I value is less than a predetermined, possibly operator-defined, threshold (i.e., where QoS requirements, which may also be operator-defined, are not satisfied), precise information of all the CDMA sectors whose serving areas do not meet adequate network performance, and information regarding the overall network performance (e.g., the information might show that 10% of the sectors in the network have a co-offset protection below the predetermined threshold for co-offset protection).

Figure 7:
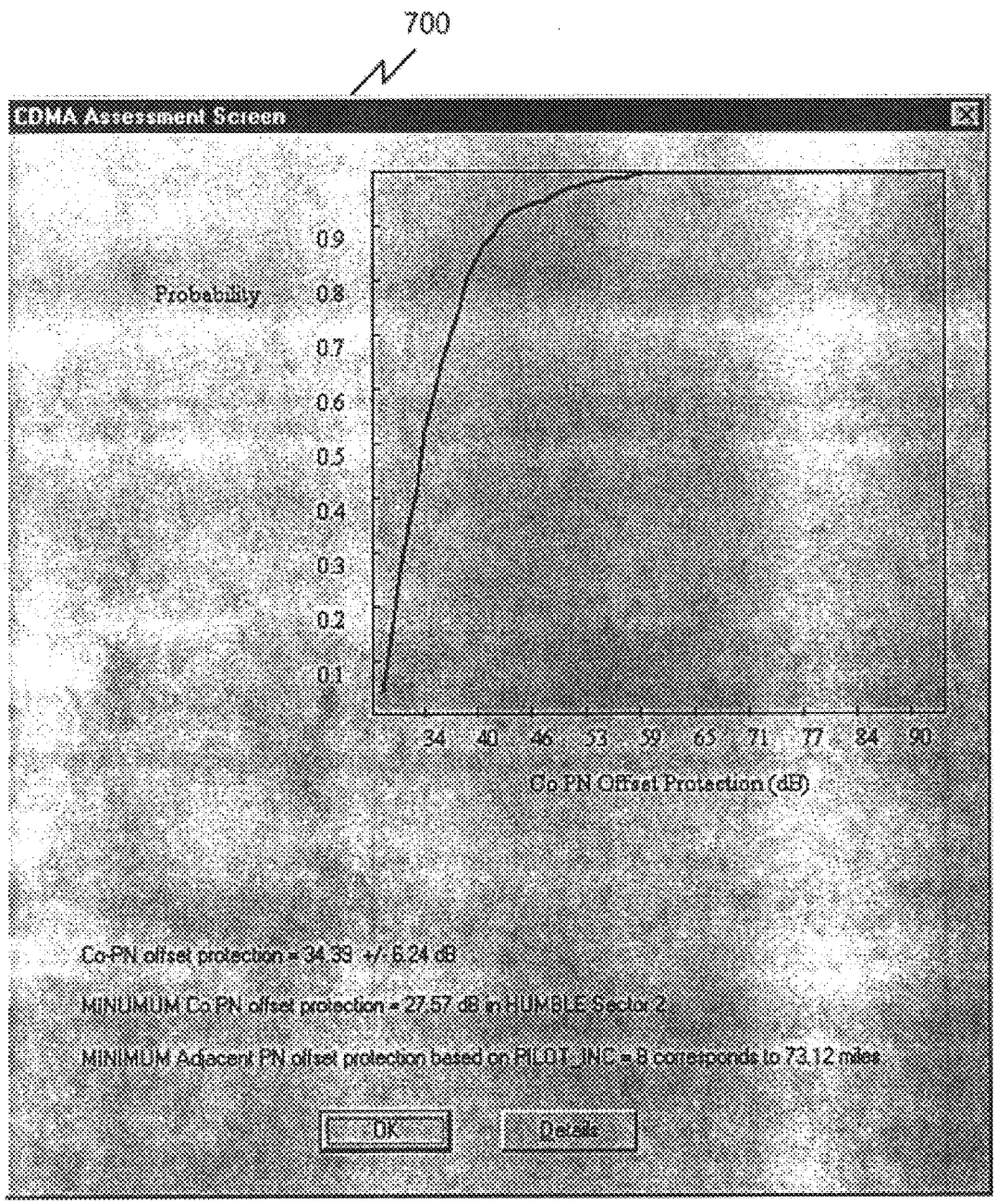
FIG. 7 is an exemplary diagram of a graphical output that may be provided to an operator.

FIG. 7 is a diagram illustrating an exemplary graphical output 700 that may be provided to an operator. The graphical output 700 provides a graph that shows the percentage of sectors in the network that have a co-offset protection value below the predetermined threshold.

The system may sort this information by co-offset protection values. In other words, if there are 3 sectors in the network that have poor performance (e.g., sectors A, B, and C), the system sorts them in order of co-offset protection values. For example, assume that the co-offset protection values for sectors A, B, and C are x, y, and z dB, respectively. x dB is the $C/I_{TOTAL}$ for sector A, and $I_{TOTAL}$ is the interference caused to sector A from all the other co-offset sectors that have the same PN offset as sector A. Assume that there are three such co-offset sectors D, E and F in the network. y dB is the $C/I_{TOTAL}$ for sector B. Assume that there are two co-offset sectors G and H causing interference to sector B. z dB is the $C/I_{TOTAL}$ for sector C.

In the above example, in addition to the co-offset protection determined at/for sector A, the system also determines pairwise interference estimates from each of the co-offset sectors D, E, and F. In other words, the system determines precise pairwise C/I values (or interference estimates) between sectors D and A, between E and A, and between F and A. The system may also sort these values by pairwise C/I (in dB).

Thus, if sector A is the worst performing sector in the network, the system generates precise information about which sector(s) (D, E or F) is the worst interferer(s). Similarly for sector B (second worst), the system generates precise interference information from its co-offset sectors G and H, and so on.

Once each of the problematic areas have been identified, the system (as described above) identifies the worst co-offset interferers [step 640]. The system then identifies measures to reduce interference by selectively changing or tuning some parametric settings, such as pilot power levels, antenna beamwidths, antenna gains, antenna tilt angles, cable losses, etc., relating to the poor-performing sectors and their worst interferer(s) [step 650]. These changes effect the pairwise C/I values between the poor-performing sectors and their worst interferer(s) (e.g., between sectors D and A, E and A, or F and A), and improve the overall network performance in terms of the minimum co-offset protection available in the network. The system then returns to step 320 in FIG. 3 to estimate the pairwise C/I values of all sectors in the network.

CONCLUSION

Systems and methods consistent with the present invention provide optimal PN planning in a CDMA network by, among other things, addressing problematic areas in the network. In addition, the systems and methods permit an operator to manually change the PN offset for any existing sector and immediately assess the network performance (in terms of co-offset protection). This is very useful in quickly assessing the impact of changing the assigned PN offset (by the planning module) of an interfering sector.

Further, when adding new growth cell sites, microcells, highway-aimed spot sectors, emergency-purpose cell sites, or temporary use cell sites (e.g., at a stadium sports event or a convention), the systems and methods permit an immediate assessment of network performance without the need for performing network PN planning. Of course, however, PN offsets must first be assigned to the new sites/sectors either automatically (i.e., from a file) or manually.

The systems and methods also provide the following benefits over conventional systems: (1) they take into account the underlying network performance at each and every possible wireless unit location; (2) they determine the amount of CDMA traffic at each wireless unit location, taking into account the appropriate land use-land cover weights, population weights, highway enhancements, etc.; (3) they reduce the possibility of wrong synchronizations to the extent possible; (4) they make it easier to add more growth sites without retuning the entire network; and (5) they quickly estimate network performance without re-running the whole PN planning analysis.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while the foregoing description described a CDMA system, systems and methods consistent with the present invention may be implemented in other spread spectrum systems. The scope of the invention is defined by the claims and their equivalents.

What is claimed is:

1. A computer-implemented method for assigning PN offsets in a network having a plurality of sectors, comprising:
   setting parameters for the network;
   assigning PN offsets to the sectors based on the set parameters;
   identifying sectors in the network having poor network performance as a result of the PN offset assignments;
   changing parameters for the identified sectors; and
   reassigning PN offsets to the sectors based on the changed parameters to improve network performance.

2. The method of claim 1, wherein the setting parameters includes:
   designating power settings for communication channels, antenna gain, and handoff thresholds.

3. The method of claim 2, wherein the setting parameters further includes:
   identifying each of the sectors in the network as one of a regular, border, and beacon sector, and
   setting power thresholds for each of the sectors based on the designated power settings and whether the identified sector is a regular, border, or beacon sector.

4. The method of claim 1, wherein the setting parameters includes:
   determining potential interference between any pair of the sectors in the network.

5. The method of claim 4, wherein the setting parameters further includes:
   identifying constraints for each of the sectors based on the potential interference.

6. The method of claim 5, wherein the identifying constraints includes:
   setting at least one of a constraint that regulates PN offset separation between sectors of a same cell site, a constraint that regulates PN offset separation between neighboring sectors, and a constraint that regulates PN offset separation between sectors and neighbors of sectors neighboring the sectors.

7. The method of claim 1, wherein the identifying sectors includes:
   determining sectors failing to meet a predetermined quality of service criteria.

8. The method of claim 1, wherein the identifying sectors includes:
   detecting sectors causing interference to the identified sectors.

9. The method of claim 8, wherein the detecting sectors includes:
   identifying sectors causing the most interference to the identified sectors.

10. The method of claim 8, wherein the changing parameters includes:
    changing parameters for the detected sectors.

11. The method of claim 1, further comprising:
    setting an initial co-offset protection value for the network.

12. The method of claim 11, wherein the assigning PN offsets includes:
    determining whether the PN offset assignments were successful,
    reducing the initial co-offset protection value if the PN offset assignments were unsuccessful, and
    increasing the initial co-offset protection value if the PN offset assignments were successful.

13. A system for assigning PN offsets in a network having a plurality of sectors, comprising:
    means for setting parameters for the network;
    means for assigning PN offsets to the sectors based on the set parameters;
    means for identifying sectors in the network having poor network performance as a result of the PN offset assignments;
    means for changing parameters for the identified sectors; and
    means for reassigning PN offsets to the sectors based on the changed parameters to improve network performance.

14. A system for assigning PN offsets in a network having a plurality of sectors, comprising:
    a memory that stores instructions; and
    a processor configured to execute the instructions in the memory to set parameters for the network, assign PN offsets to the sectors based on the set parameters, identify sectors in the network having poor network performance as a result of the PN offset assignments, change parameters for the identified sectors, and reassign PN offsets to the sectors based on the changed parameters to improve network performance.

15. The system of claim 14, wherein when setting the parameters, the processor is configured to designate power settings for communication channels, antenna gain, and handoff thresholds.

16. The system of claim 15, wherein when setting the parameters, the processor is configured to identify each of the sectors in the network as one of a regular, border, and beacon sector, and set power thresholds for each of the sectors based on the designated power settings and whether the identified sector is a regular, border, or beacon sector.

17. The system of claim 15, wherein when setting the parameters, the processor is configured to determine potential interference between any pair of the sectors in the network.

18. The system of claim 17, wherein when setting the parameters, the processor is further configured to identify constraints for each of the sectors based on the potential interference.

19. The system of claim 18, wherein when identifying the constraints, the processor is configured to set at least one of a constraint that regulates PN offset separation between sectors of a same cell site, a constraint that regulates PN offset separation between neighboring sectors, and a constraint that regulates PN offset separation between sectors and neighbors of sectors neighboring the sectors.

20. The system of claim 15, wherein when identifying the sectors, the processor is configured to determine sectors failing to meet a predetermined quality of service criteria.

21. The system of claim 15, wherein when identifying the sectors, the processor is configured to detect sectors causing interference to the identified sectors.

22. The system of claim 21, wherein when detecting the sectors, the processor is configured to identify sectors causing the most interference to the identified sectors.

23. The system of claim 21, wherein when changing the parameters, the processor is configured to change parameters for the detected sectors.

24. The system of claim 15, wherein the processor is further configured to set an initial co-offset protection value for the network.

25. The system of claim 24, wherein when assigning PN offsets, the processor is configured to determine whether the PN offset assignments were successful, reduce the initial co-offset protection value when the PN offset assignments were unsuccessful, and increase the initial co-offset protection value when the PN offset assignments were successful.

26. A computer-readable medium containing instructions for controlling a computer to perform a method for assigning PN offsets in a network having a plurality of sectors, the method comprising:

setting parameters for the network;

assigning PN offsets to the sectors based on the set parameters;

identifying sectors in the network having poor network performance as a result of the PN offset assignments;

changing parameters for the identified sectors; and reassigning PN offsets to the sectors based on the changed parameters to improve network performance.

27. The computer-readable medium of claim 26, wherein the setting parameters includes:

designating power settings for communication channels, antenna gain, and handoff thresholds.

28. The computer-readable medium of claim 27, wherein the setting parameters further includes:

identifying each of the sectors in the network as one of a regular, border, and beacon sector, and setting power thresholds for each of the sectors based on the designated power settings and whether the identified sector is a regular, border, or beacon sector.

29. The computer-readable medium of claim 26, wherein the setting parameters includes:

determining potential interference between any pair of the sectors in the network.

30. The computer-readable medium of claim 29, wherein the setting parameters further includes:

identifying constraints for each of the sectors based on the potential interference.

31. The computer-readable medium of claim 30, wherein the identifying constraints includes:

setting at least one of a constraint that regulates PN offset separation between sectors of a same cell site, a constraint that regulates PN offset separation between neighboring sectors, and a constraint that regulates PN offset separation between sectors and neighbors of sectors neighboring the sectors.

32. The computer-readable medium of claim 26, wherein the identifying sectors includes:

determining sectors failing to meet a predetermined quality of service criteria.

33. The computer-readable medium of claim 26, wherein the identifying sectors includes:

detecting sectors causing interference to the identified sectors.

34. The computer-readable medium of claim 33, wherein the detecting sectors includes:

identifying sectors causing the most interference to the identified sectors.

35. The computer-readable medium of claim 33, wherein the changing parameters includes:

changing parameters for the detected sectors.

36. The computer-readable medium of claim 26, wherein the method further comprises:

setting an initial co-offset protection value for the network.

37. The computer-readable medium of claim 36, wherein the assigning PN offsets includes:

determining whether the PN offset assignments were successful, reducing the initial co-offset protection value if the PN offset assignments were unsuccessful, and increasing the initial co-offset protection value if the PN offset assignments were successful.

38. A method for assigning PN offsets in a network having a plurality of sectors, comprising:

determining potential interference between each of the sectors and wireless units in the network;

identifying constraints for each of the sectors based on the determined potential interference;

assigning PN offsets to the sectors based on the identified constraints;

assessing network performance as a result of the PN offset assignments;

receiving a change to the PN offset assignment for at least one of the sectors; and reassessing network performance as a result of the received change.

39. A method for assigning PN offsets in a network having a plurality of sectors, comprising:

setting parameters for the network;

assigning PN offsets to the sectors based on the set parameters;

identifying at least a first sector in the network having poor network performance;

identifying at least a second sector in the network causing interference to the first sector;

changing parameters for at least one of the first and second sectors; and reassigning PN offsets to the sectors based on the changed parameters to improve network performance.

* * * * *